(12) United States Patent
Brauer

(10) Patent No.: US 10,801,968 B2
(45) Date of Patent: Oct. 13, 2020

(54) ALGORITHM SELECTOR BASED ON IMAGE FRAMES

(71) Applicant: KLA-TENCOR CORPORATION, Milpitas, CA (US)

(72) Inventor: Bjorn Brauer, Beaverton, OR (US)

(73) Assignee: KLA-Tencor Corporation, Milpitas, CA (US)

(*) Notice: Subject to any disclaimer, the term of this patent is extended or adjusted under 35 U.S.C. 154(b) by 0 days.

(21) Appl. No.: 16/389,442

(22) Filed: Apr. 19, 2019

(65) Prior Publication Data
US 2020/0132610 A1 Apr. 30, 2020

Related U.S. Application Data

(60) Provisional application No. 62/751,077, filed on Oct. 26, 2018.

(51) Int. Cl.
*G01N 21/88* (2006.01)
*G01N 21/95* (2006.01)
*G01N 21/956* (2006.01)

(52) U.S. Cl.
CPC ..... *G01N 21/8851* (2013.01); *G01N 21/8806* (2013.01); *G01N 21/9501* (2013.01); *G01N 21/956* (2013.01); *G01N 2021/889* (2013.01)

(58) Field of Classification Search
CPC ........... G01N 21/8851; G01N 21/8806; G01N 21/9501; G01N 21/956; G01N 2021/889
See application file for complete search history.

(56) References Cited

U.S. PATENT DOCUMENTS

| 6,539,106 | B1* | 3/2003 | Gallarda | G01R 31/307 382/149 |
|---|---|---|---|---|
| 8,000,922 | B2 | 8/2011 | Chen et al. | |
| 8,289,508 | B2 | 10/2012 | Lim et al. | |
| 8,605,275 | B2 | 12/2013 | Chen et al. | |
| 9,310,316 | B2 | 4/2016 | Wu et al. | |
| 9,418,413 | B1* | 8/2016 | Koren | G06T 7/001 |
| 9,535,010 | B2 | 1/2017 | Gosain et al. | |
| 9,601,393 | B2 | 3/2017 | Lee et al. | |
| 9,702,827 | B1 | 7/2017 | Brauer et al. | |
| 9,711,327 | B2* | 7/2017 | Koronel | H01J 37/265 |
| 9,714,905 | B1* | 7/2017 | Plihal | G05B 19/41875 |
| 10,338,002 | B1* | 7/2019 | Danen | G01N 21/8851 |
| 2004/0228515 | A1 | 11/2004 | Okabe et al. | |

(Continued)

FOREIGN PATENT DOCUMENTS

KR 20150043448 A 4/2015

OTHER PUBLICATIONS

Kaizerman, "Sampling Optimization," Semicon Europa 2015, 2015, 20 pages.

(Continued)

*Primary Examiner* — Deoram Persaud
(74) *Attorney, Agent, or Firm* — Hodgson Russ LLP

(57) ABSTRACT

Based on job dumps for defects of interest and nuisance events for multiple optical modes, detection algorithms, and attributes, the best combination of the aforementioned is identified. Combinations of each of the modes with each of the detection algorithms can be compared for all the defects of interest detected at an offset of zero. Capture rate versus nuisance rate can be determined for one of the attributes in each of the combinations.

20 Claims, 6 Drawing Sheets

(56) References Cited

U.S. PATENT DOCUMENTS

| | | | |
|---|---|---|---|
| 2006/0115143 A1* | 6/2006 | Auerbach | G01N 21/95607 |
| | | | 382/149 |
| 2008/0279444 A1 | 11/2008 | Fischer et al. | |
| 2009/0284733 A1 | 11/2009 | Wallingford et al. | |
| 2011/0320149 A1* | 12/2011 | Lee | G01N 21/9501 |
| | | | 702/83 |
| 2014/0050389 A1* | 2/2014 | Mahadevan | G06T 7/0004 |
| | | | 382/149 |
| 2014/0303921 A1* | 10/2014 | Jayaraman | H01L 22/12 |
| | | | 702/82 |
| 2014/0354983 A1 | 12/2014 | Kolchin et al. | |
| 2016/0282404 A1* | 9/2016 | Goren | H01L 22/12 |
| 2018/0143144 A1* | 5/2018 | Mori | G01N 21/9501 |
| 2018/0149603 A1* | 5/2018 | Bhattacharyya | G01N 21/9505 |
| 2018/0276808 A1* | 9/2018 | Brauer | G06T 7/0006 |
| 2018/0330511 A1* | 11/2018 | Ha | G06K 9/6247 |
| 2018/0348147 A1* | 12/2018 | Shifrin | H01L 22/12 |
| 2019/0287015 A1* | 9/2019 | Plihal | G06N 20/00 |
| 2019/0287232 A1* | 9/2019 | Brauer | G06T 7/001 |
| 2019/0302031 A1 | 10/2019 | Plihal et al. | |
| 2019/0383753 A1* | 12/2019 | Zhang | G06T 7/174 |
| 2020/0089130 A1* | 3/2020 | Chao | G03F 7/70616 |

OTHER PUBLICATIONS

Chong et al., "Accelerated 65nm Yield Ramp through Optimization of Inspection on Process-Design Sensitive Test Chips," 2007 IEEE/SEMI Advanced Semiconductor Manufacturing Conference, 2007, pp. 69-73.

WIPO, ISR for PCT/US2019/058145, dated Feb. 13, 2020.

* cited by examiner

ALGORITHM SELECTOR BASED ON IMAGE FRAMES

CROSS-REFERENCE TO RELATED APPLICATIONS

This application claims priority to the provisional patent application filed Oct. 26, 2018 and assigned U.S. App. No. 62/751,077, the disclosure of which is hereby incorporated by reference.

FIELD OF THE DISCLOSURE

This disclosure relates to semiconductor wafer inspection algorithm selection.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

An optics selector was previously used to obtain a signal-to-noise ratio for selected defect of interest (DOI) and nuisance events. The best optical mode and detection algorithm were selected based on this ratio. Hot scans were later run for several optical modes and algorithms and then a nuisance event filter was configured for each optical mode. The best mode and algorithm were identified by comparing a final pareto for each optical mode.

A "hot scan" generally refers to a measurement/inspection of a wafer performed to detect defects or take measurements on the wafer by applying relatively aggressive detection settings (e.g., thresholds substantially close to the noise floor). In this manner, the hot scan may be performed to collect inspection or measurement data about the wafer that will be used for the tuning process (e.g., optics selection and algorithm tuning). The goal of the hot scan may be to detect a representative sample of all defect and nuisance types on the wafer in the selected mode(s).

Current methods do not evaluate DOI capture versus nuisance rate during the initial optical mode selection stage. Currently, optical modes and algorithms are compared based on signal-to-noise values. This is insufficient.

To compare nuisance rates, a scan consisting of one or more die rows was run. The recipe was tuned with a sensitivity tuner nuisance event filter (STNEF). Paretos containing DOI and nuisance events were compared. The selected combinations of algorithm, optical mode, and attribute could be assessed only if a recipe was completely configured, several die rows were run, and an STNEF was created. This process consumes many hours or even days, which is too slow for semiconductor manufacturing.

How well DOI and nuisance can be separated in an STNEF can only be assessed after running a hot scan. Often no second attempt to find a better mode based on tunability is performed. Whether a different mode-algorithm combination would be better for tuning remains unclear because it is typically too time-consuming.

A wafer scan may be run when new algorithms or attributes are introduced before the performance of the improved attribute or detection algorithm is compared to the old one. Besides occupying tool time that otherwise could be used for inspection or production, an engineer must set up and tune all the inspection recipes, which can be time-consuming.

There are many drawbacks for the current optics or algorithm selector. The currently-implemented optics or algorithm selector results in one signal-to-noise number for each selected defect and nuisance event. Those numbers could give mixed results about the best optical mode because the numbers do not always follow the same trend for each DOI. Second, based on optics selector, it may not be known if a certain mode/inspection algorithm is tunable with certain attributes such as, for example, energy, brightness, or multi-die adaptive threshold (MDAT) Offset. Third, setting up an STNEF is user-dependent and makes algorithm or mode comparisons difficult because it can be affected by human error and judgement. Fourth, without using an STNEF, scans usually exceed the total number of defects per wafer. Such scans cannot be performed because the defect detection algorithm itself reports too many nuisance defects. The defect detection algorithm runs hot similar to a hot scan meaning that many small defects are found. An STNEF is needed to use of all the attributes which are calculated from the images of the detected defects to further tune the count of the defects to a reasonable number.

Therefore, an improved semiconductor wafer inspection algorithm selection technique is needed.

BRIEF SUMMARY OF THE DISCLOSURE

A system is provided in a first embodiment. The system comprises a light source configured to direct a beam of light at a wafer, a detector that collects the beam of light reflected from the wafer, and a processor in electronic communication with the detector. The processor is configured to receive image frames for defects of interest and nuisance events on a wafer for a plurality of optical modes. The processor is further configured to determine difference images and attributes for the plurality of optical modes using a plurality of detection algorithms. The process is further configured to compare combinations of each of the plurality of optical modes with each of the plurality of detection algorithms for all the defects of interest detected at an offset of zero and determine capture rate versus nuisance rate for one of the attributes in each of the combinations.

The processor can be further configured to identify the defects of interest and the nuisance events.

The processor can be further configured to filter at least one of the defects of interest in a threshold region or at least one of the defects of interest that exceeds an attribute value from the comparing.

The processor can be further configured to sort the combinations by an attribute.

The processor can be further configured to select an optimal combination of one of the optical modes and one of the detection algorithms for a selected nuisance rate or a selected defect of interest capture rate. The optimal combination may be selected using a receiver operating curve plot.

A method is provided in a second embodiment. The method comprises receiving, at a processor, image frames for defects of interest and nuisance events on a wafer for a plurality of optical modes. Using the processor, difference images and attributes are determined for the plurality of optical modes using a plurality of detection algorithms. Using the processor, combinations of each of the plurality of optical modes with each of the plurality of detection algorithms are compared for all the defects of interest detected at an offset of zero. Using the processor, capture rate versus nuisance rate is determined for one of the attributes in each of the combinations.

The defects of interest and the nuisance events can be identified using the processor.

Using the processor, at least one of the defects of interest in a threshold region or at least one of the defects of interest that exceeds an attribute can be filtered from the comparing.

Using the processor, the combinations can be sorted by an attribute.

Using the processor, an optimal combination of one of the optical modes and one of the detection algorithms can be selected for a selected nuisance rate or a selected defect of interest capture rate. The optimal combination is can be selected using a receiver operating curve plot.

A non-transitory computer-readable storage medium is provided in a third embodiment. The non-transitory computer-readable storage medium comprises one or more programs for executing the following steps on one or more computing devices. Difference images and attributes are determined for a plurality of optical modes using a plurality of detection algorithms based on image frames for defects of interest and nuisance events on a wafer for the plurality of optical modes. Combinations of each of the plurality of optical modes are compared with each of the plurality of detection algorithms for all the defects of interest detected at an offset of zero. Capture rate versus nuisance rate is determined for one of the attributes in each of the combinations.

The steps can include identifying the defects of interest and the nuisance events.

The steps can include filtering at least one of the defects of interest in a threshold region or at least one of the defects of interest that exceeds an attribute value from the comparing.

The steps can include sorting the combinations by an attribute.

The steps can include selecting an optimal combination of one of the optical modes and one of the detection algorithms for a selected nuisance rate or a selected defect of interest capture rate using a receiver operating curve plot.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein improve algorithm selection capability by selecting algorithm based on image frames. DOI need to be differentiated from nuisance, and the recipe that is selected can help differentiate DOI from nuisance. Whereas current methods to select a base inspection algorithm and optics mode for a given selection of DOI and nuisance events only use signal-to-noise values of DOI and nuisance (e.g., optics selector), an algorithm/optical mode combination can be selected to be used in a full wafer scan. Optical modes can be compared with a detection algorithm using capture rate versus nuisance rate plots instead of signal-to-noise values, which can be used to select the optical mode and algorithm.

Figure 1:
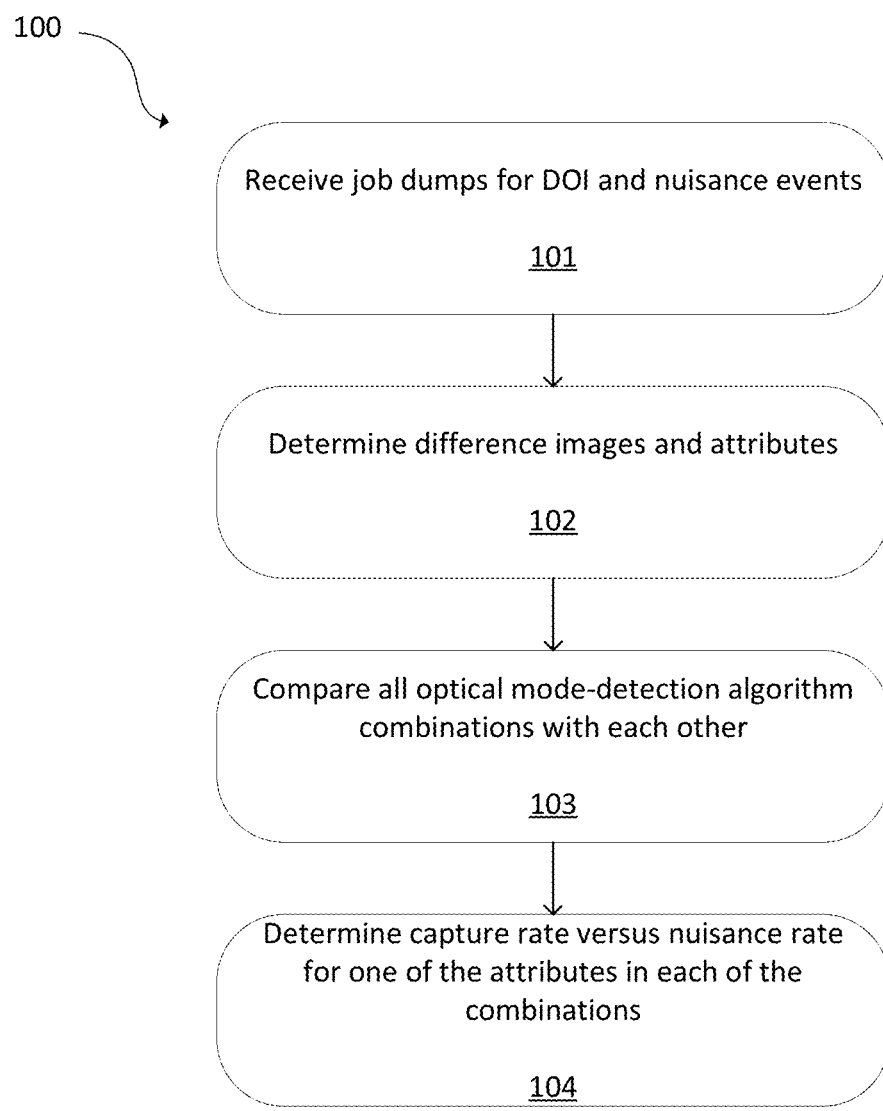
FIG. 1 is a flowchart of an embodiment of a method in accordance with the present disclosure.

FIG. 1 is a flowchart of an embodiment of a method 100. Some or all of the steps of method 100 can be performed using a processor. The processor may be part of an optical inspection tool or an algorithm selector.

At 101, job dumps are received for defects of interest and nuisance events for a plurality of modes. Job dumps can be a collection of image frames from a wafer being inspected that can be which are consumed by defect detection algorithm and used for attribute calculation. This may include eight image frames for adjacent dies. For example, one image frame may be collected every 1 cm.

Difference images and attributes are determined for a plurality of optical modes using a plurality of detection algorithms at 102. Examples of detection algorithms include MDAT, MCAT, SRD, or NanoMDAT, which may include difference filters. Examples of optical modes include aperture, wavelength range, polarization of light, or stage speed. Other detection algorithms or optical modes are possible.

Regarding the detection algorithms, MDAT refers to multi die adaptive threshold. MDAT is a defect detection algorithm that performs outlier detection based on 2D histogram of the median grey-level and the difference grey level of the candidate and a certain number of reference images. MCAT refers to multi-color adaptive threshold. MCAT is a defect detection algorithm that works like MDAT but corrects for die-to-die process variation. SRD refers to single reference die, which is a defect detection algorithm that uses a certain reference die on the same or different wafer. NanoMDAT refers to nano multi die adaptive threshold. NanoMDAT is a defect detection algorithm which calculates the noise value based on a small area such as a patch image.

In an instance, an optical mode includes one aperture, one wavelength range, a certain polarization of light, and a certain stage speed. If ten different apertures, ten different wavelength ranges, and three polarizations are considered, then there are three hundred possible combinations. Each of these combinations is a different optical mode.

At 103, combinations of each of the plurality of optical modes are compared with each of the plurality of detection algorithms for all the defects of interest detected at an offset of zero. An offset of zero means that the detection algorithm is running hot to find as many defects as possible. At least one of the defects of interest in a threshold region and/or at least one of the defects of interest that exceeds an attribute value can be filtered from the comparison.

A capture rate versus nuisance rate for one of the attributes is determined for each of the combinations at 104. Attributes can include, for example, magnitude (e.g., highest difference grey level value of the defect) or offset (e.g., grey level distance to a noise floor). The best detection algorithm-optical mode combination can be determined based on the best performance at a given nuisance rate or DOI capture rate.

In an instance, an optimal combination of one of the optical modes and one of the detection algorithms can be selected for a selected nuisance rate or a selected defect of interest capture rate. The optimal combination also can include a setting for one or more attributes.

For example, based on a selection of job dumps, a DOI capture rate versus nuisance rate plot is derived. DOI capture rate is a number of true positive events divided by a sum of true positive events and false positive events. Nuisance rate is a number of false positive events divided by a sum of true positive events and false positive events. For a given nuisance rate, the detection algorithm, optical mode, and/or attribute combination with the highest DOI capture rate can be selected. For a given DOI capture rate, the detection algorithm, optical mode, and/or attribute combination with the lowest nuisance rate can be selected.

A receiver operating curve (ROC) plot can be derived to plot the true positive rate over the false positive rate. The curve can be fitted and the area under the curve can be calculated. The curve with the largest area under curve (AUC) value can indicate which detection algorithm, optical mode, and/or attribute combination is best. Using the ROC, for a given false positive rate the detection algorithm, optical mode, and/or attribute combination with the highest true positive rate can be selected. Using the ROC, for a given true positive rate the detection algorithm, optical mode, and/or attribute combination with the lowest false positive rate can be selected.

Figure 5:
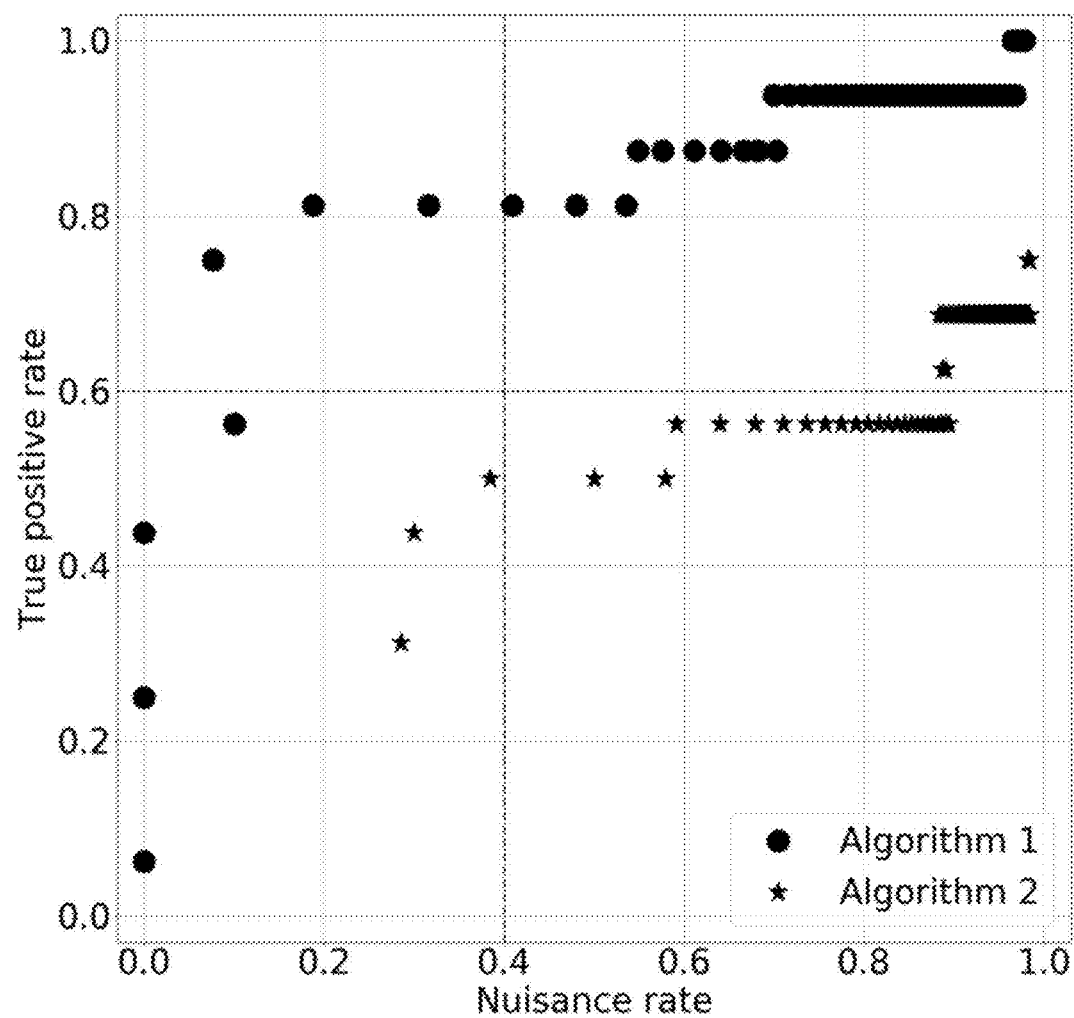
FIG. 5 is a chart comparing DOI capture rate (true positive rate) versus nuisance rate for two exemplary detection algorithms.
Figure 6:
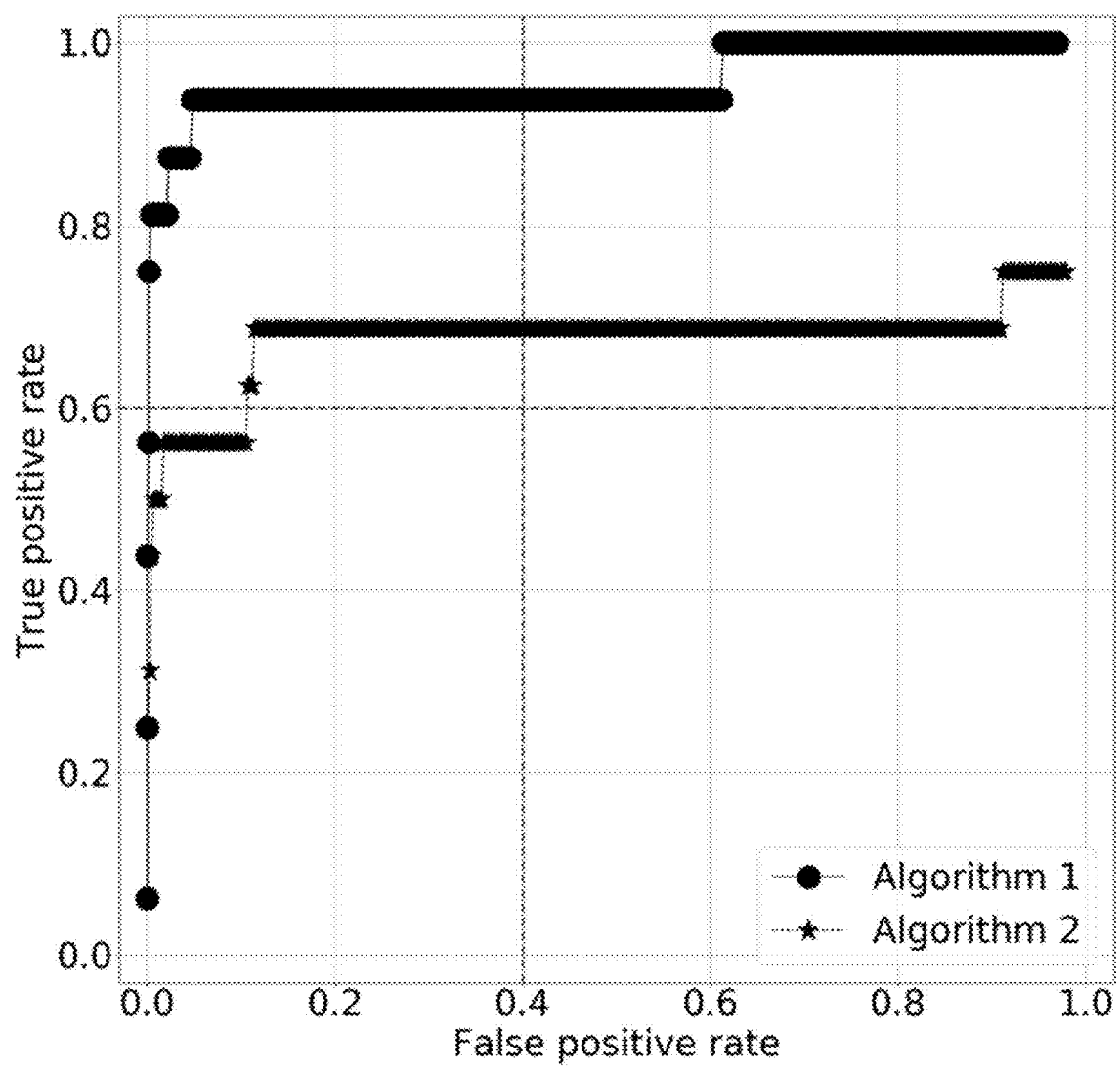
FIG. 6 is a receiver operating curve plot comparing DOI capture rate (true positive rate) versus false positive rate for the two exemplary detection algorithms.

FIG. 5 is a chart comparing DOI capture rate (true positive rate) versus nuisance rate for two exemplary detection algorithms. FIG. 6 is a receiver operating curve plot comparing DOI capture rate (true positive rate) versus false positive rate for the two exemplary detection algorithms. The ROC plot consists of points which are not connected by a line because it is not a function (for which every x has only one y). Thus, every nuisance rate has not only one DOI capture rate.

The DOI and the nuisance events can be identified. For example, an algorithm or a user can identify DOI or nuisance events in an image.

Using this frame level-based algorithm, the optical mode, detection algorithm, and attribute selection may be performed. Settings on an optical inspection tool or other tools in a semiconductor manufacturing facility can be changed based on the results of method 100.

Embodiments disclosed herein can provide faster time-to-results because mode-algorithm combination decisions can be made during an initial optical mode/detection algorithm selection process by using all the information (e.g., grey level and difference grey level) distribution in an image frame and not only the pixels where a defect is located. STNEF is not used when making optical mode and/or detection algorithm decisions. STNEF recipe tuning can be time-consuming. Wafer scans for many optical mode/detection algorithm combinations also can be avoided, which saves time on the inspection tool because full wafer scans may not be needed.

Subjective decisions by users when tuning different optical mode/detection algorithm combinations is avoided. The optical mode/detection algorithm selection process is not based merely on signal-to-noise, but also is based on actual capture versus nuisance rate. Actual capture versus nuisance rate may matter more to a semiconductor manufacturer because it allows the semiconductor manufacturer to set thresholds or meet manufacturing targets.

Another advantage of the embodiments disclosed herein is that whether a recipe will be tunable and the expected nuisance rate can be determined during an initial optical mode/detection algorithm selection.

Figure 2:
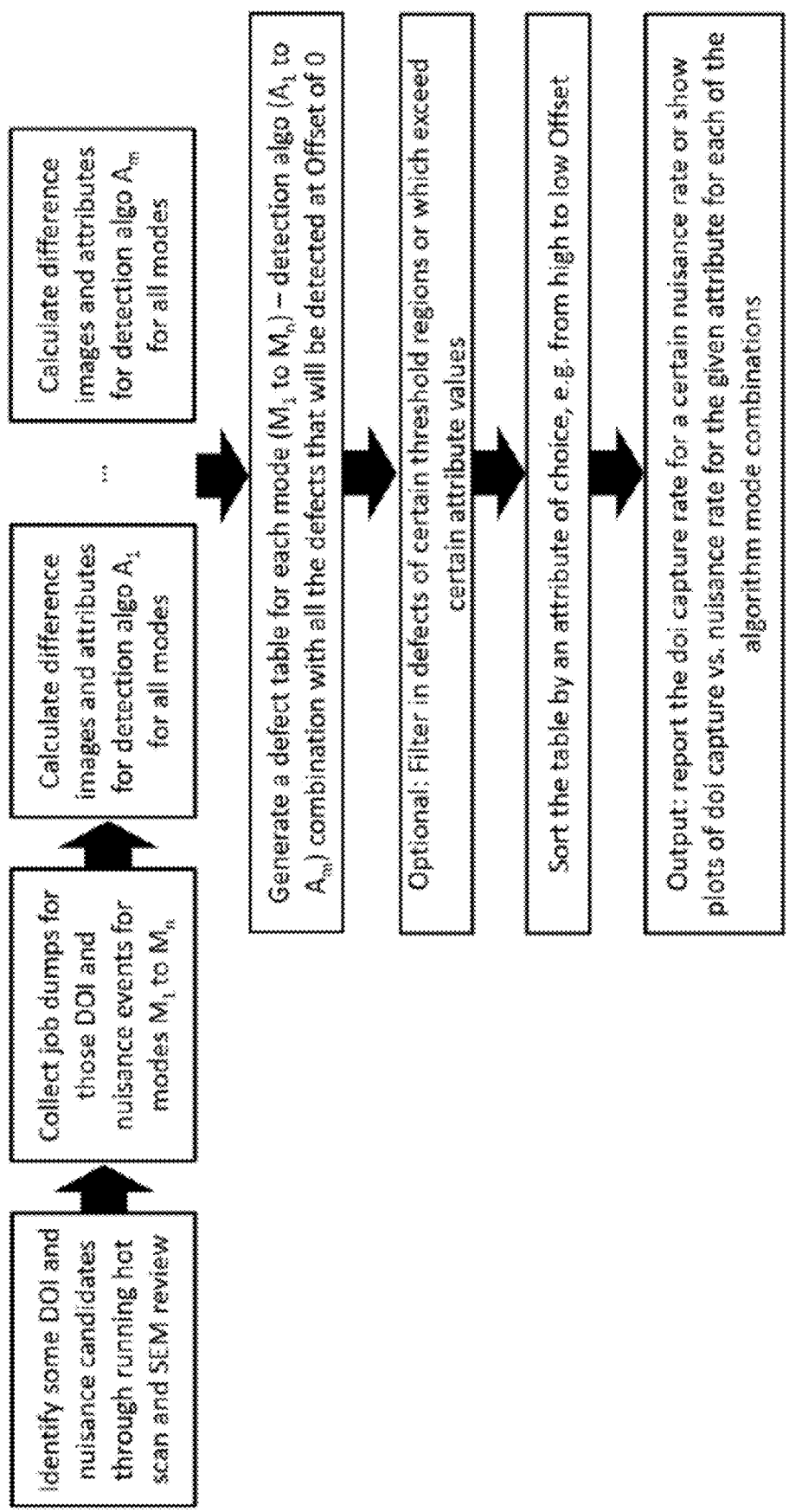
FIG. 2 is a flowchart of an example using the method of FIG. 1.

FIG. 2 is a flowchart of an example using the method 100. For example, a combination of optical modes ($M_1$ to $M_n$) and detection algorithms ($A_1$ to $A_m$) are compared. The best optical mode/algorithm combination may be determined using a plot.

Figure 3:
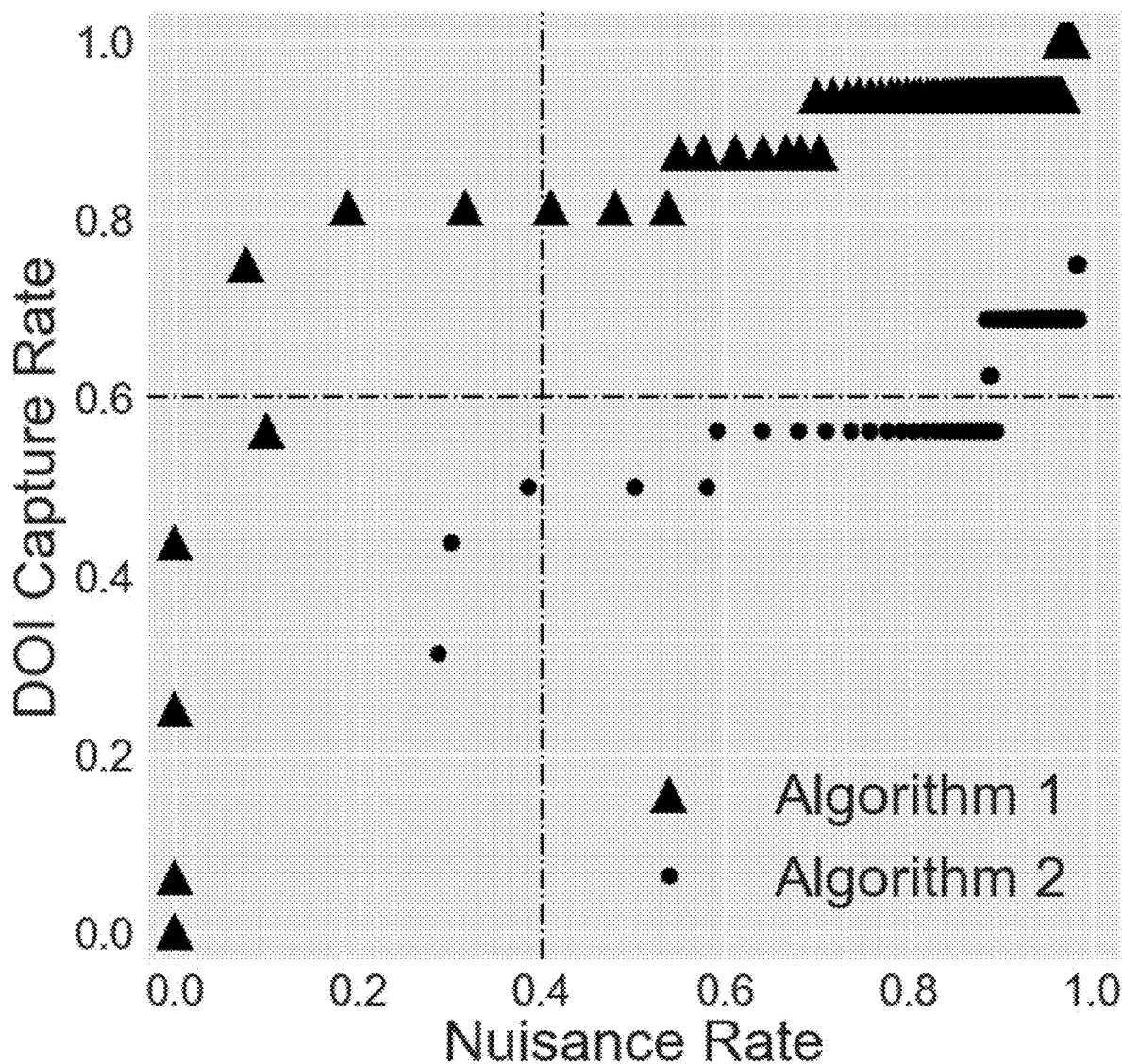
FIG. 3 is a chart comparing DOI capture rate versus nuisance rate for an example.

FIG. 3 is a chart comparing DOI capture rate versus nuisance rate for an example. A user can set a certain nuisance rate target. For example, a nuisance rate of 40% is shown with the vertical dotted line. The optical mode/detection algorithm combinations with a higher DOI capture rate at this value can be selected.

The user also can select a certain DOI capture rate target. For example, a DOI capture rate of 60% is shown with the horizontal dotted line. The detection algorithm with the lower nuisance rate at this DOI capture rate can be selected.

The DOI capture rate and nuisance rate can be adjusted. For example, a semiconductor manufacturer may want the best DOI capture rate at a nuisance rate of 60%.

FIG. 3 illustrates a single optical mode. Two optical modes can be plotted against an algorithm, such as with a 3D plot.

Instead of comparing detection algorithms, different optical modes can be compared for the same detection algorithm or two difference filters can be compared for the same detection algorithm. Two attributes also can be compared by keeping all the other variables, such as optical mode and detection algorithm, constant.

Figure 4:
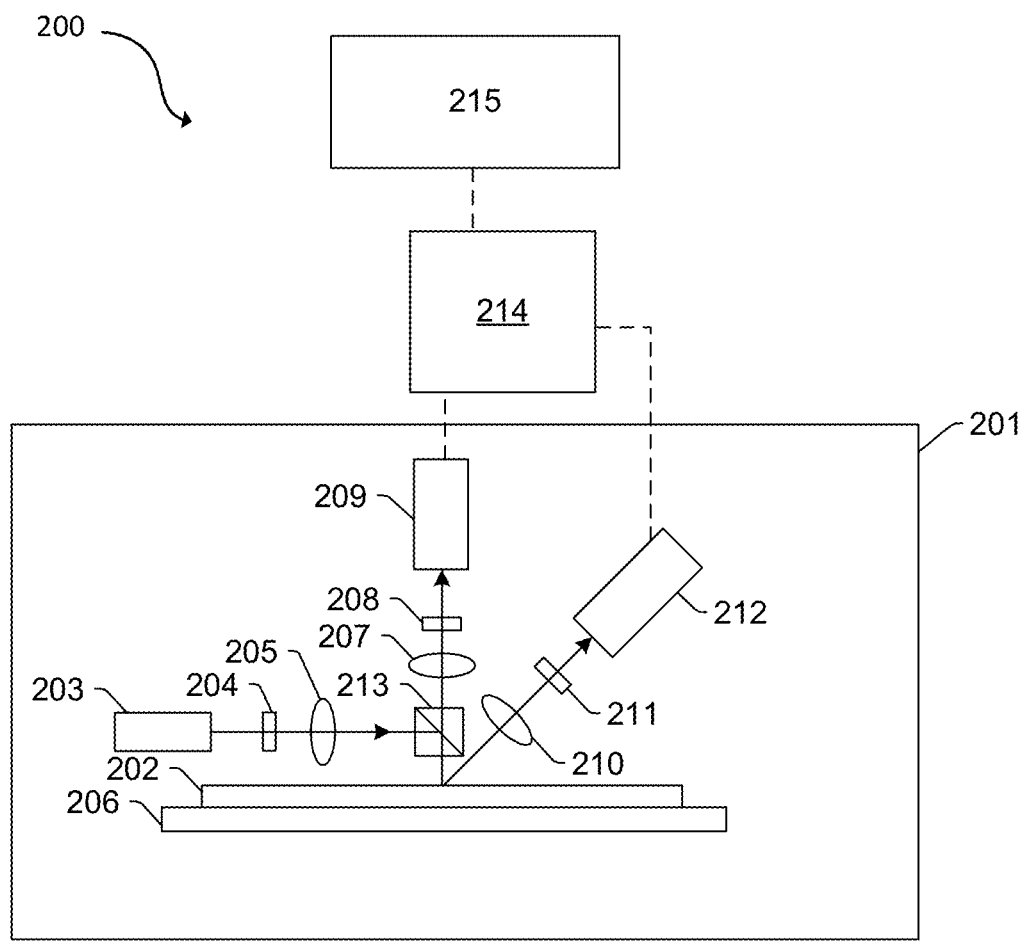
FIG. 4 is a block diagram of an embodiment of a system in accordance with the present disclosure.

One embodiment of a system 200 is shown in FIG. 4. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen includes a reticle. The reticle may include any reticle known in the art.

In the embodiment of the system 200 shown in FIG. 4, optical based subsystem 201 includes an illumination subsystem configured to direct light to specimen 202. The illumination subsystem includes at least one light source. For example, as shown in FIG. 4, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 4, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 4. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 4 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 4) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205.

Although lens 205 is shown in FIG. 4 as a single refractive optical element, it is to be understood that, in practice, lens 205 may include a number of refractive and/or reflective optical elements that in combination focus the light from the optical element to the specimen. The illumination subsystem shown in FIG. 4 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 4 includes two detection channels, one formed by collector 207, element 208, and detector 209 and another formed by collector 210, element 211, and detector 212. As shown in FIG. 4, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 4, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 4 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 4 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 4 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 4 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with an SEM.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to receive job dumps for defects of interest and nuisance events for a plurality of modes. Difference images and attributes for the plurality of modes can be determined using a plurality of detection algorithms. Combinations of each of the plurality of modes can be compared with each of the plurality of detection algorithms with all the defects of interest detected at an offset of zero. A capture rate versus nuisance rate is determined for one of the attributes in each of the combinations. Other steps of the method embodiments, such as those described with respect to FIG. 1 or FIG. 2, can be performed.

An additional embodiment relates to a non-transitory computer-readable medium storing program instructions executable on a controller for performing a computer-implemented method for determining capture rate versus nuisance rate for one of the attributes in the combinations, as disclosed herein. In particular, as shown in FIG. 4, electronic data storage unit 215 or other storage medium may contain non-transitory computer-readable medium that includes program instructions executable on the processor 214. The computer-implemented method may include any step(s) of any method(s) described herein, including method 100 or the method illustrated in FIG. 2.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a light source configured to direct a beam of light at a wafer
a detector that collects the beam of light reflected from the wafer; and
a processor in electronic communication with the detector, wherein the processor is configured to:
receive image frames for defects of interest and nuisance events on a wafer for a plurality of optical modes;
determine difference images and attributes for the plurality of optical modes using a plurality of detection algorithms;
compare combinations of each of the plurality of optical modes with each of the plurality of detection algorithms for all the defects of interest detected at an offset of zero; and
determine capture rate versus nuisance rate for one of the attributes in each of the combinations.

2. The system of claim 1, wherein the processor is further configured to identify the defects of interest and the nuisance events.

3. The system of claim 1, wherein the processor is further configured to filter at least one of the defects of interest in a threshold region from the comparing.

4. The system of claim 1, wherein the processor is further configured to filter at least one of the defects of interest that exceeds an attribute value from the comparing.

5. The system of claim 1, wherein the processor is further configured to sort the combinations by an attribute.

6. The system of claim 1, wherein the processor is further configured to select an optimal combination of one of the optical modes and one of the detection algorithms for a selected nuisance rate or a selected defect of interest capture rate.

7. The system of claim 6, wherein the optimal combination is selected using a receiver operating curve plot.

8. A method comprising:
receiving, at a processor, image frames for defects of interest and nuisance events on a wafer for a plurality of optical modes;
determining, using the processor, difference images and attributes for the plurality of optical modes using a plurality of detection algorithms;
comparing, using the processor, combinations of each of the plurality of optical modes with each of the plurality of detection algorithms for all the defects of interest detected at an offset of zero; and
determining, using the processor, capture rate versus nuisance rate for one of the attributes in each of the combinations.

9. The method of claim 8, further comprising identifying the defects of interest and the nuisance events using the processor.

10. The method of claim 8, further comprising filtering, using the processor, at least one of the defects of interest in a threshold region from the comparing.

11. The method of claim 8, further comprising filtering, using the processor, at least one of the defects of interest that exceeds an attribute value from the comparing.

12. The method of claim 8, further comprising sorting, using the processor, the combinations by an attribute.

13. The method of claim 8, further comprising selecting, using the processor, an optimal combination of one of the optical modes and one of the detection algorithms for a selected nuisance rate or a selected defect of interest capture rate.

14. The method of claim 13, wherein the optimal combination is selected using a receiver operating curve plot.

15. A non-transitory computer-readable storage medium, comprising one or more programs for executing the following steps on one or more computing devices:

determining difference images and attributes for a plurality of optical modes using a plurality of detection algorithms based on image frames for defects of interest and nuisance events on a wafer for the plurality of optical modes;

comparing combinations of each of the plurality of optical modes with each of the plurality of detection algorithms for all the defects of interest detected at an offset of zero; and determining capture rate versus nuisance rate for one of the attributes in each of the combinations.

16. The non-transitory computer-readable storage medium of claim 15, wherein the steps include identifying the defects of interest and the nuisance events.

17. The non-transitory computer-readable storage medium of claim 15, wherein the steps include filtering at least one of the defects of interest in a threshold region from the comparing.

18. The non-transitory computer-readable storage medium of claim 15, wherein the steps include filtering at least one of the defects of interest that exceeds an attribute value from the comparing.

19. The non-transitory computer-readable storage medium of claim 15, wherein the steps include sorting the combinations by an attribute.

20. The non-transitory computer-readably storage medium of claim 15, wherein the steps include selecting an optimal combination of one of the optical modes and one of the detection algorithms for a selected nuisance rate or a selected defect of interest capture rate using a receiver operating curve plot.

* * * * *